Nov. 29, 1938.　　A. E. GABA　　2,138,487
ADJUSTABLE PITCH PROPELLER
Filed July 17, 1936　　7 Sheets-Sheet 3
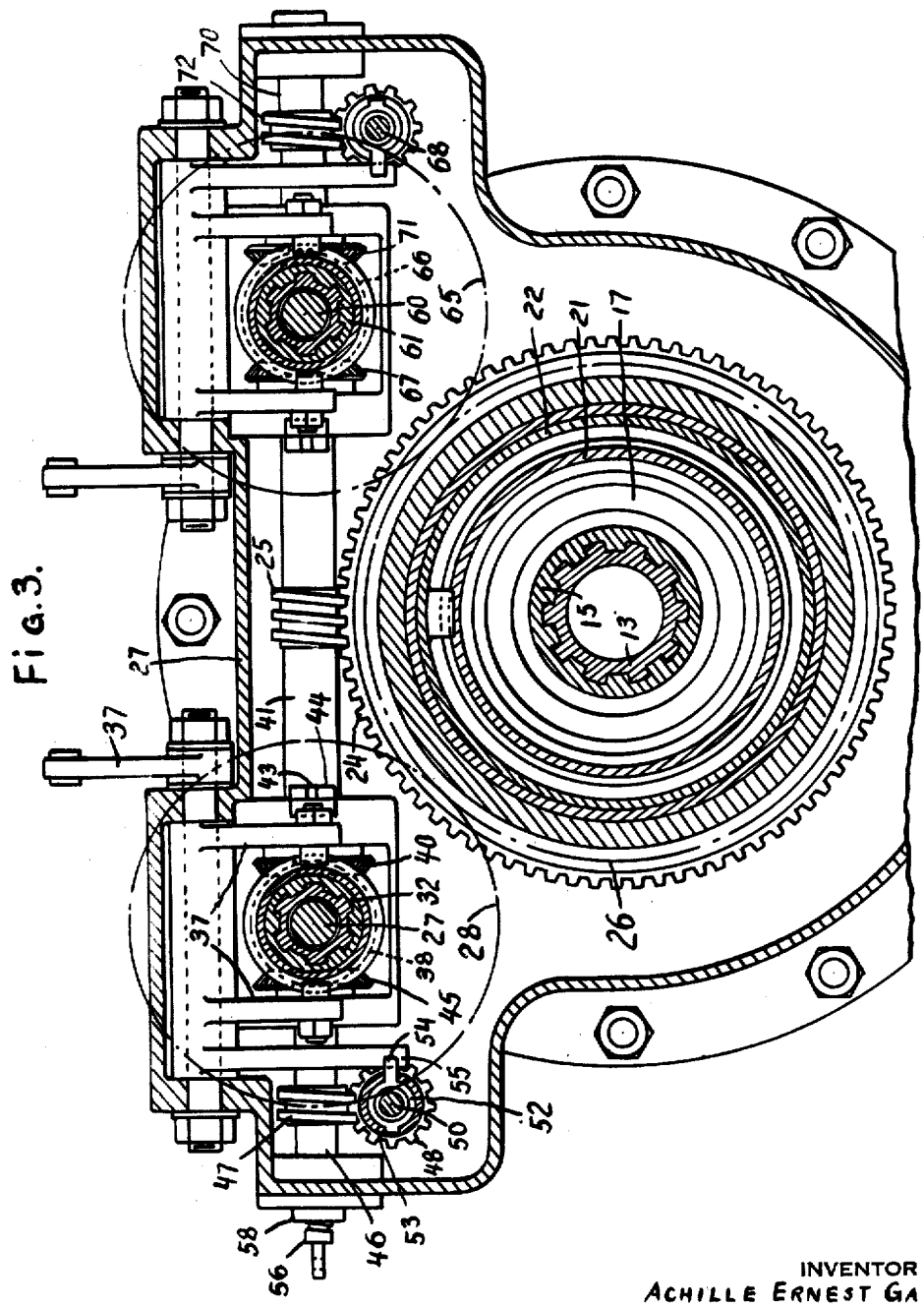
INVENTOR
ACHILLE ERNEST GABA
BY
ATTORNEYS

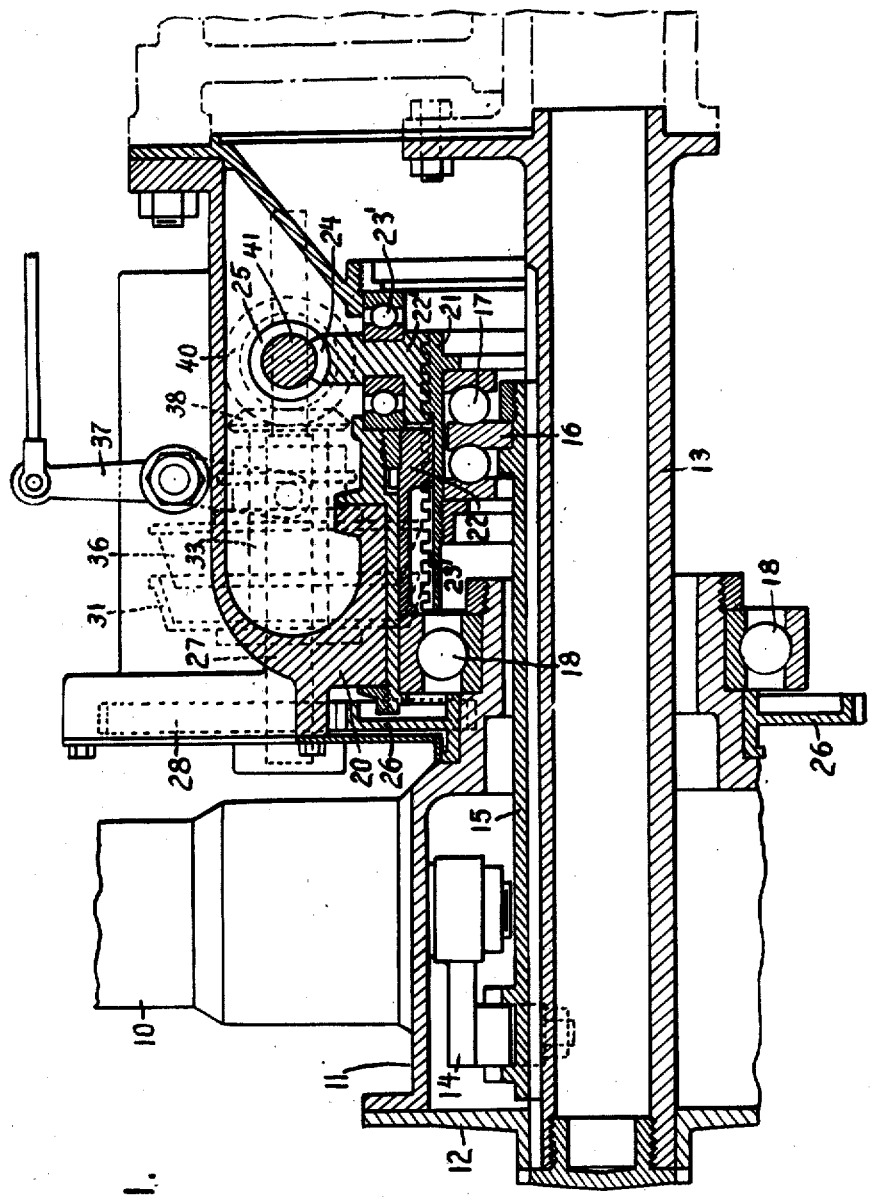

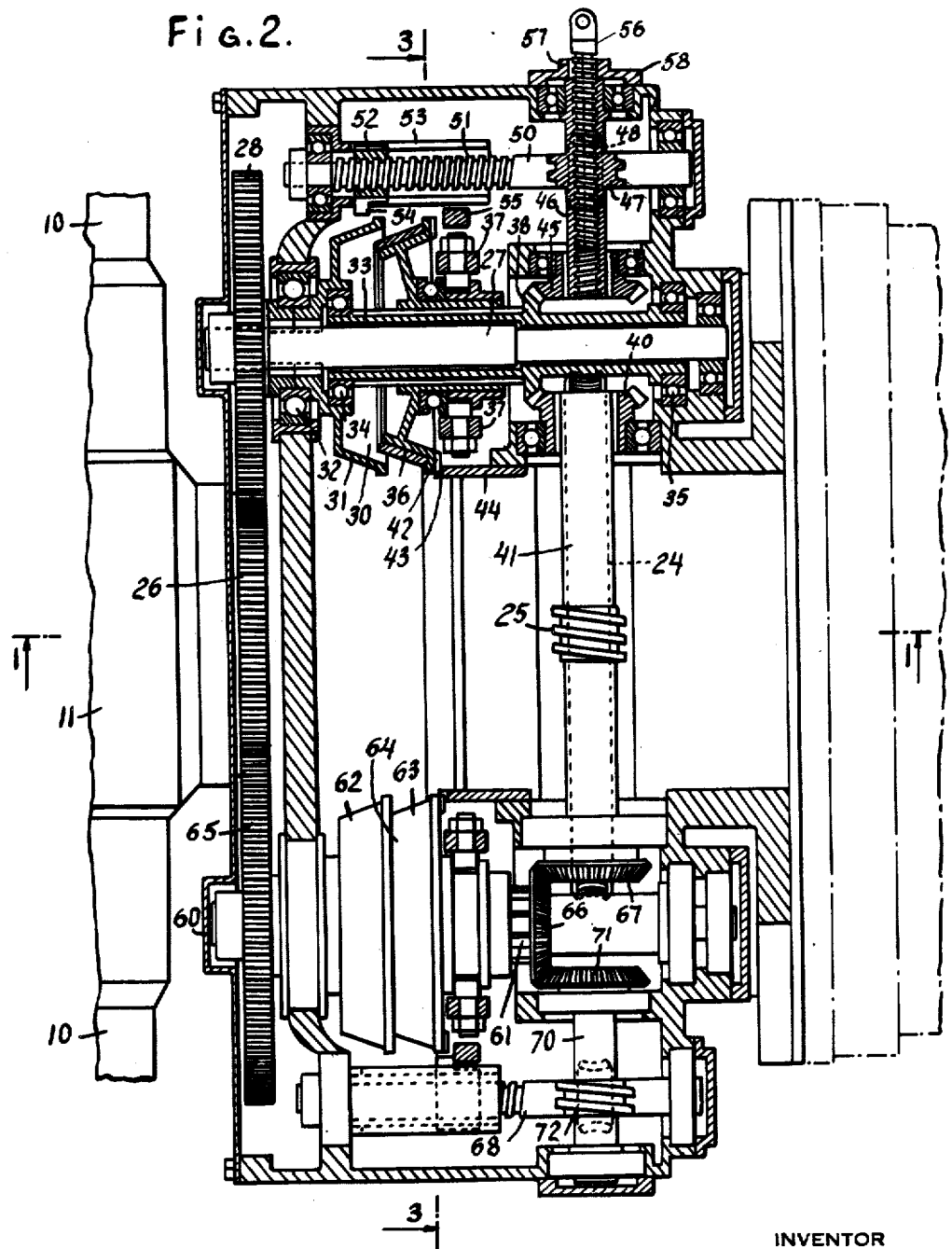

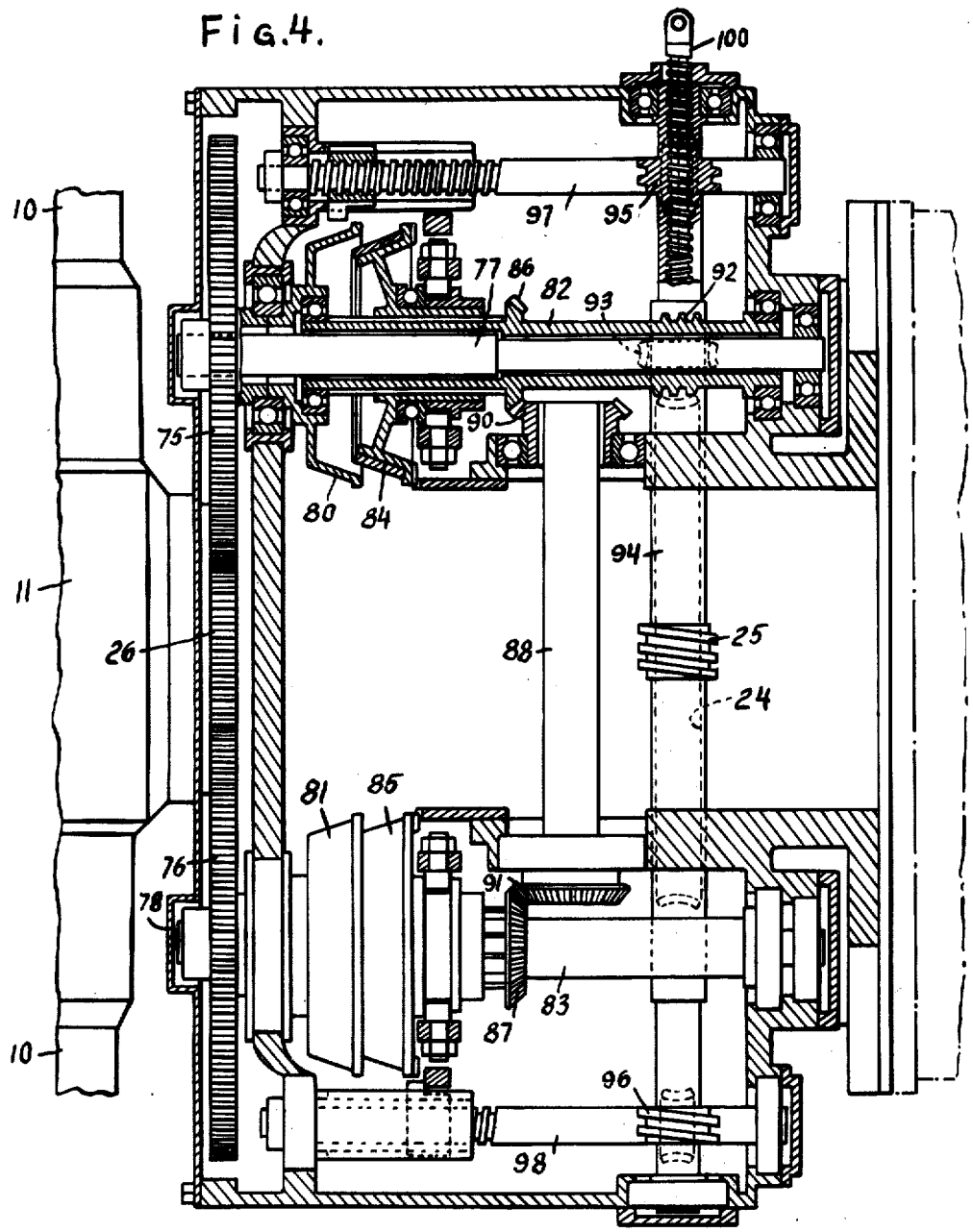

Nov. 29, 1938.  A. E. GABA  2,138,487
ADJUSTABLE PITCH PROPELLER
Filed July 17, 1936  7 Sheets-Sheet 5
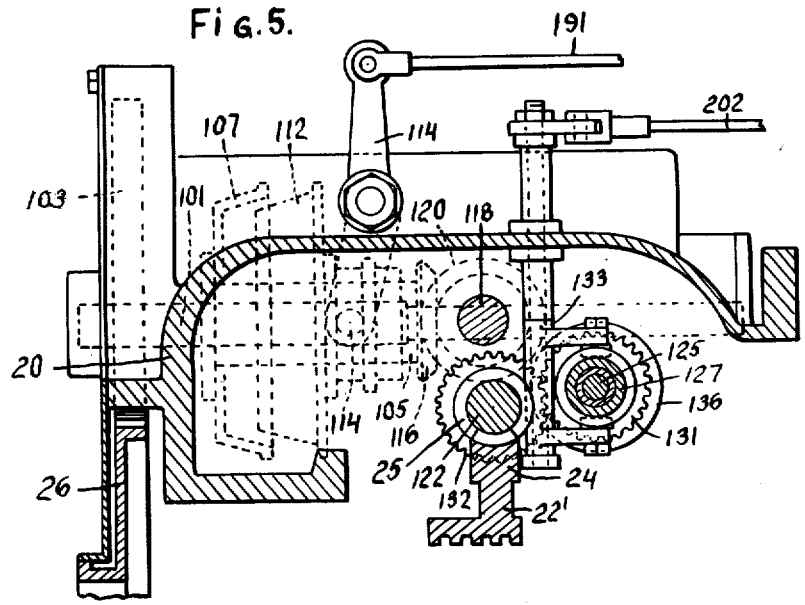
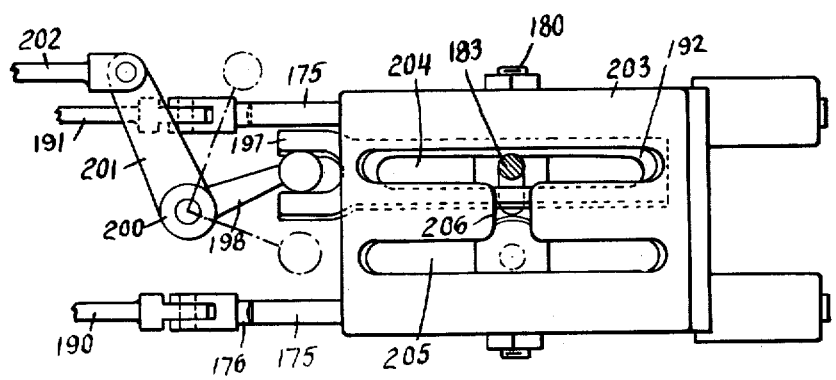
INVENTOR
ACHILLE ERNEST GABA
BY
ATTORNEYS

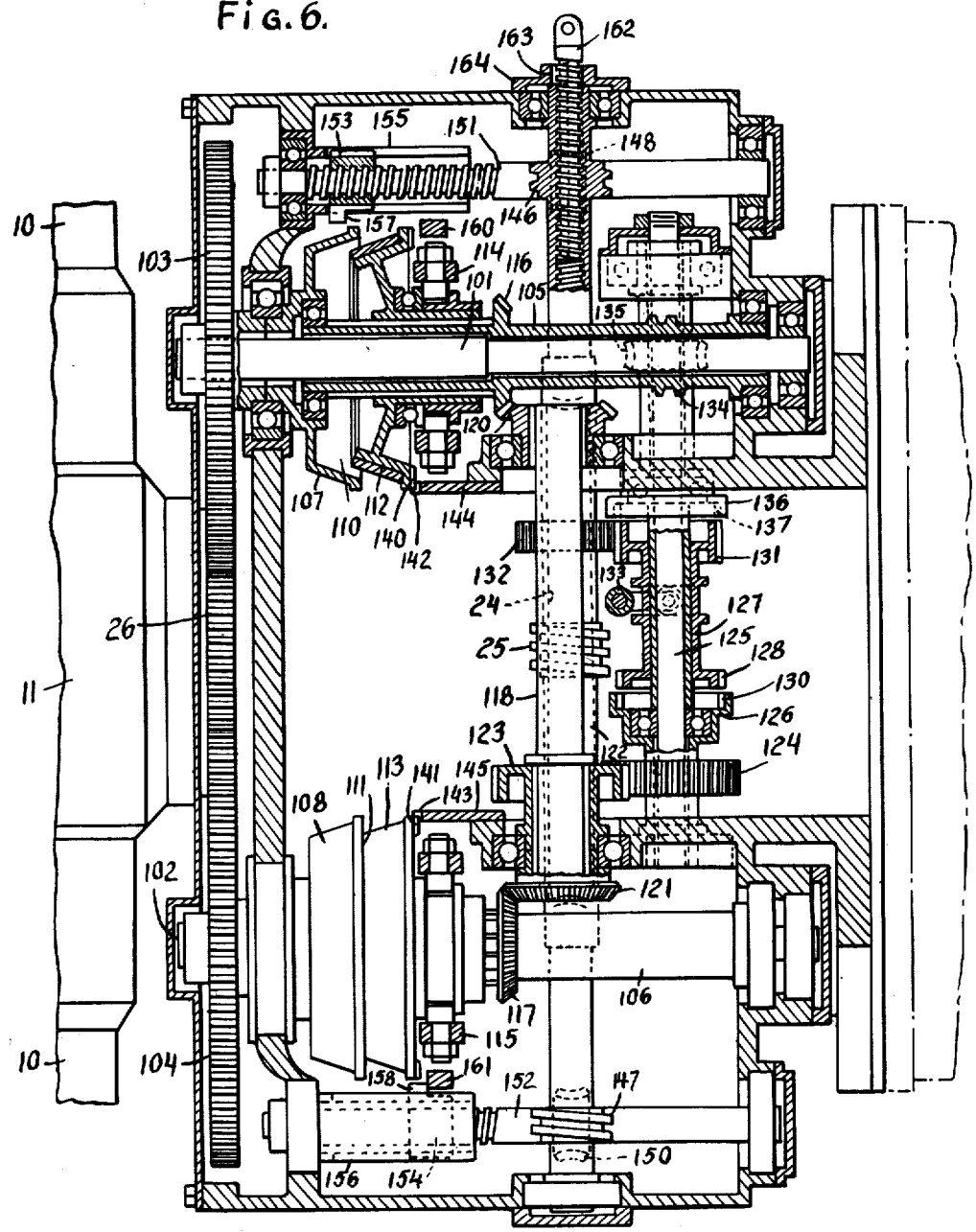

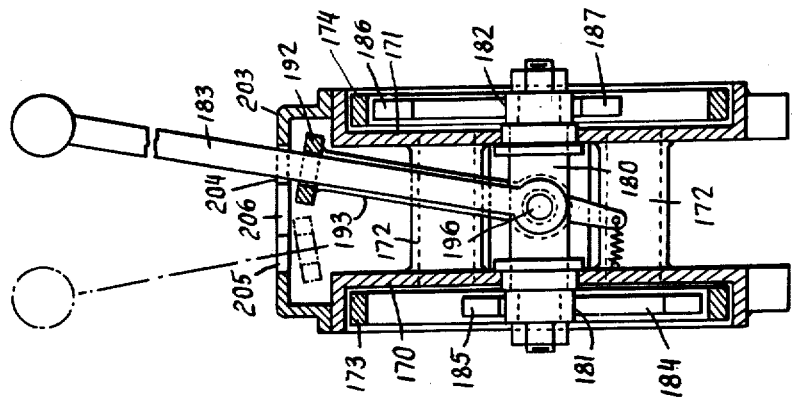
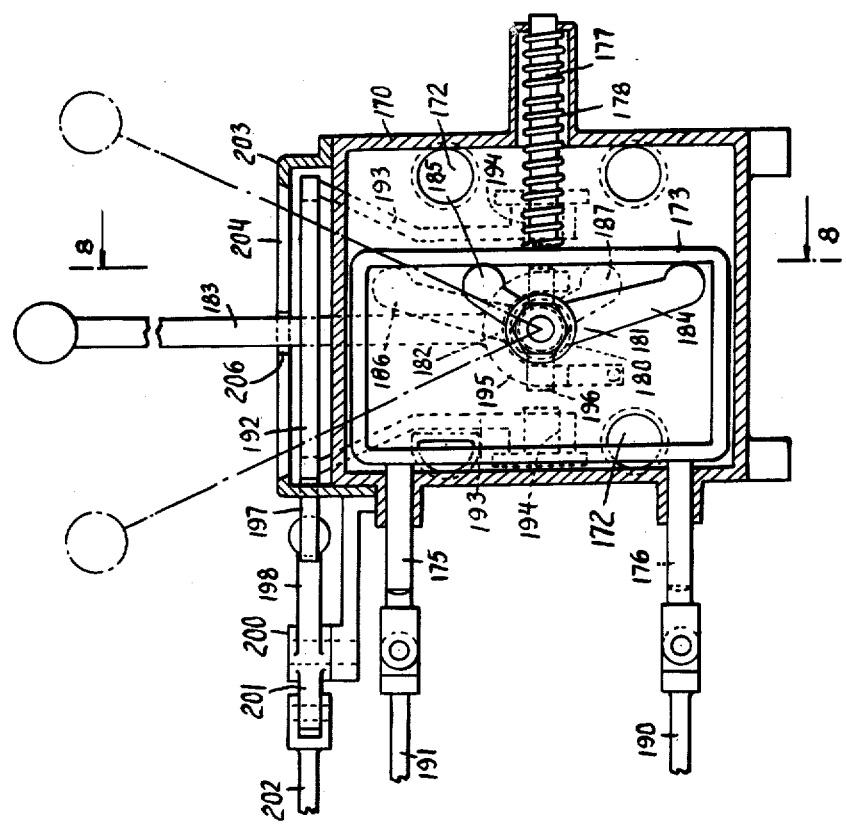

Patented Nov. 29, 1938

2,138,487

UNITED STATES PATENT OFFICE 2,138,487

ADJUSTABLE PITCH PROPELLER

Achille Ernest Gaba, Paris, France

Application July 17, 1936, Serial No. 91,025
In France December 17, 1935

6 Claims. (Cl. 170—163)

This invention relates to adjustable pitch propellers. More particularly, the invention relates to mechanism for adjusting the pitch of a propeller and has for its principal object the provision of improved apparatus for adjusting the pitch of a propeller while the propeller is in operation. This application is a continuation in part of my copending application Serial No. 757,536, filed December 14th, 1934, which issued as United States Patent No. 2,054,810 on September 22, 1936.

In an adjustable pitch propeller assembly, the rate at which it should be possible to change the pitch of the propeller blades depends upon the condition under which the assembly is being used. For some purposes, it is desirable to change the pitch of the propeller blades relatively rapidly; for example, a change of about 45° within the space of time required for 100 revolutions of the propeller is sometimes desirable. In other circumstances, a relatively slow rate of change in pitch is desirable, say a change of 45° per 1000 or 1500 revolutions of the propeller. If the propeller assembly generally operates under relatively constant conditions, it usually is not necessary to provide for changing the pitch of the propeller blades at more than one rate, but it sometimes is desirable to be able optionally to change pitch either rapidly or slowly. Thus, in an adjustable pitch propeller assembly associated with an aeroplane it is sometimes advantageous to be able to change the pitch of the propeller blades either slowly, as in flight, in order to secure accurate adjustment thereof, or rapidly, as on landing in order to use the propeller as a brake.

In one of its forms, the present invention provides apparatus for adjusting the pitch of a propeller blade at a relatively rapid rate. In another of its forms, the invention provides apparatus for changing the pitch of a propeller blade relatively slowly. In still another of its forms, the invention provides apparatus for changing the pitch of a propeller blade either rapidly or slowly, at the option of the operator. The apparatus of the invention is particularly well adapted for use in connection with the adjustable pitch propeller described and claimed in my above-mentioned application Serial No. 757,536.

In accordance with the invention, rotational motion of the propeller assembly is utilized to turn the propeller blades about their longitudinal axis, thereby to adjust the pitch of the propeller blades.

Apparatus according to the invention comprises a pitch adjustment drive shaft suitably mounted adjacent the rotatable portion of the propeller assembly and associated therewith so that rotational motion of the propeller assembly may be imparted to the pitch adjustment drive shaft. The pitch adjustment drive shaft is adapted to engage with a transmission shaft, which in turn actuates the means for turning the propeller blades about their longitudinal axis, thereby to adjust the pitch of the propeller blades. Clutch means associated with the pitch adjustment drive shaft are provided to transmit the rotational motion imparted to the pitch adjustment drive shaft to the transmission shaft. Turning of the propeller blades to change the pitch thereof is effected only when the clutch means are in the engaged position. When the clutch means are in the disengaged position the propeller blades are held against turning about their longitudinal axes.

In its preferred form, the apparatus of the invention comprises two pitch adjustment drive shafts, each having clutch means associated therewith. One of the pitch adjustment drive shafts serves to increase the pitch of the propeller blades, and the other pitch adjustment drive shaft serves to decrease the pitch of the propeller blades.

In one form of the apparatus of the invention, the transmission shaft for transmitting power to blade-turning means is so associated with a pitch adjustment drive shaft through the clutch member thereon that adjustment of the pitch of the blades may be effected rapidly. In another form of the apparatus of the invention, the transmission shaft is associated with a pitch adjustment drive shaft through the clutch mounted thereon by means of suitable reducing gearing, thereby to operate the transmission shaft at a relatively slow rate to change the pitch of the propeller blades relatively slowly. In still another form of the apparatus of the invention, the transmission shaft is associated with a clutch mounted on a pitch adjustment drive shaft through suitable transmission means, including a speed selector clutch member, by means of which it is possible to drive the transmission shaft, and, consequently, to adjust the pitch of the propeller blades, either rapidly or slowly, at the option of the operator.

When two pitch adjustment drive shafts, each having a clutch associated therewith, are employed, as in the preferred form of the invention, it is desirable to prevent simultaneous engagement of both clutches. Consequently, the invention provides clutch control means of such nature that only one clutch may be introduced into the engaged position at one time. The clutch control means may also be adapted to control the speed selector clutch member associated with the transmission means employed in the third form of the apparatus of the invention mentioned above.

The invention will be better understood from the following description, considered in connection with the accompanying drawings, in which:

Fig. 1 is a longitudinal cross-section, taken substantially along the line 1—1 of Fig. 2, through apparatus for rapidly changing the pitch of a propeller blade, and showing in cross-section suitable blade-turning mechanism;

Fig. 2 is a horizontal cross-section through apparatus for rapidly changing the pitch of a propeller blade;

Fig. 3 is a vertical cross-section taken substantially along the line 3—3 of Fig. 2;

Fig. 4 is a horizontal cross-section similar to Fig. 2, but showing apparatus for changing the pitch of a propeller blade relatively slowly;

Fig. 5 is a longitudinal cross-section through apparatus for changing the pitch of a propeller blade either rapidly or slowly, as the operator desires;

Fig. 6 is a horizontal cross-section through the apparatus shown in Fig. 5;

Fig. 7 is an elevation, partially in cross-section, of clutch control means;

Fig. 8 is a vertical cross-section taken substantially along the line 8—8 of Fig. 7; and Fig. 9 is a plan of the apparatus shown in Figs. 7 and 8.

In the apparatus shown in Figs. 1 to 3, a propeller blade 10 is so mounted on a propeller hub 11 that it may be turned about its longitudinal axis, thereby to adjust the pitch of the blade. The hub 11 is connected by a plate 12 to a propeller drive shaft 13 associated with the crank shaft of an engine (not shown) for driving the propeller assembly. The relation between the propeller hub 11 and the propeller drive shaft 13 is such that an annular space adapted to receive blade-turning mechanism is provided between these two members.

A crank arm 14 is firmly secured to the propeller blade 10 adjacent the foot thereof in such manner that a turning movement applied to the crank arm 14 will turn the blade 10 about its longitudinal axis to adjust the pitch of the blade. A slidable sleeve 15 mounted about the propeller shaft 13 in non-rotatable relationship therewith is operatively connected at one end to the crank arm 14, and, adjacent its other end, is associated with the central member 16 of a double thrust bearing 17. The sleeve 15 rotates with the propeller shaft 13, but may be slid therealong to impart a turning moment to the crank arm 14 and through it to the blade 10.

The hub 11 upon which the propeller blade is mounted is spaced from the propeller shaft 13 adjacent its rearward end portion to allow free longitudinal movement of the slidable sleeve 15, the hub 11 being centered about the propeller shaft by a suitable bearing 18 supported by a casing member 20. Longitudinal motion is imparted to the slidable sleeve 15 through the thrust bearing 17 by means of a threaded non-rotatable member 21. The threaded member 21 is held against rotation by teeth 22 engaging longitudinal slots 23 formed in the threaded member 21, but the threaded member may be moved longitudinally. Longitudinal movement is imparted to the threaded member 21 by a rotatable threaded member 22' which is held against longitudinal motion by suitable thrust bearings 23'.

The rotatable threaded member 23 comprises a worm gear 24 in engagement with a worm 25. When the worm 25 is rotated, rotational motion is imparted to the rotatable threaded member 22, and through the engaging threads of the threaded members 21 and 22. This rotational motion is translated into longitudinal movement of the non-rotatable threaded member 21. Longitudinal movement of the non-rotatable threaded member 21 is transmitted through the thrust bearing 17 to the slidable sleeve 15 and through it to the crank arm 14 associated with the propeller blade 10 to turn the propeller blade about its longitudinal axis and thereby to adjust the pitch of the blade.

The apparatus for imparting rotational motion to the worm 25 and through it to actuate the above-described blade-turning means embodies the principal features of the present invention. A gear 26 is firmly secured to the propeller hub 11 adjacent the rearward end portion thereof. A pitch adjustment drive shaft 27 is mounted above and to one side of the propeller shaft 13 and has secured to its forward end portion a gear 28 in engagement with the gear 26 secured to the propeller hub. When the propeller hub is rotating, the gear 26 rotates with it and drives the pitch adjustment drive shaft 27 through the gear 28 secured thereto. In this manner, rotational motion of the propeller assembly is made available to actuate the mechanism for adjusting the pitch of the propeller blades.

A clutch 30 is associated with the pitch adjustment drive shaft 27. The clutch 30 comprises a driving clutch member 31 securely mounted on the pitch adjustment drive shaft 27 and is suitably journaled for rotation with the pitch adjustment drive shaft 27 in bearings 32. The driving clutch member 31 rotates at all times during which the propeller assembly is in operation.

A sleeve 33 is mounted about the pitch adjustment drive shaft 27 and is suitably journaled in bearings 34 and 35 at either end thereof. The sleeve 33 is rotatable independently of the pitch adjustment drive shaft, and advantageously may be spaced therefrom. A driven member 36 of the clutch 30 is splined on the sleeve 33, so that it may be slid therealong by means of a clutch fork 37. By suitably actuating the fork 37, the driven clutch member 36 may be introduced into or withdrawn from engagement with the driving clutch member 31.

A bevel gear 38 is firmly secured to the sleeve 33, and may advantageously be formed integrally therewith. The bevel gear 38 engages a corresponding bevel gear 40 mounted on a transmission shaft 41 adjacent the end thereof, and upon the transmission shaft 41 is mounted the worm 25 for actuating the blade-turning means described above.

The operation of the apparatus is as follows: The clutch fork 37 is actuated to introduce the driven member 36 of the clutch 30 into engagement with the driving member 31 thereof. Since the driving clutch member 31 is rotating at all times during operation of the propeller assembly, rotational motion is transmitted thereby through the driven clutch member 36 to the sleeve 33 and to the bevel gear 38 mounted in the sleeve. Rotation of the bevel gear 38 causes rotation of the bevel gear 40 in engagement therewith and corresponding rotation of the transmission shaft 41 and the worm 25 mounted thereon, thereby actuating the blade-turning means. Thus it is seen that the blade-turning means is set in operation simply by introducing the two members 31 and 36 of the clutch 30 into engagement; similarly, operation of the blade-turning means is stopped by disengaging the two members of the clutch.

In order to prevent inadvertent rotation of the sleeve 33 and hence operation of the blade-turning means when the clutch members are disengaged, the driven clutch member 36 is provided with teeth 42 adapted to engage corresponding teeth 43 formed on a frame member 44 when the clutch is in the disengaged position.

It is, of course, important to avoid actuating the blade-turning means to such an extent that the pitch of the propeller blades is increased or decreased to too great a degree. For this reason, means are associated with the apparatus described above to limit the extent by which the pitch of a blade may be varied. A bevel gear 45 in engagement with the bevel gear 38 secured to he sleeve 33 is mounted on a shaft 46 adjacent one end thereof. A worm 47 is mounted on the shaft 46 in engagement with a worm gear 48 mounted on a drive-limit shaft 50. The drive-limit shaft 50 is provided with threads 51 over a distance of roughly half its length, and a correspondingly threaded member 52 is mounted on the drive-limit shaft 50 in engagement with the threads 51 formed thereon. The threaded member 52 is held against rotation by a tubular slotted member 53, and is provided with a tongue 54 projecting sufficiently far through a slot in the tubular member 53 so that it may engage with an arm 55 associated with the clutch fork 37.

When the clutch 30 is engaged to drive the transmission shaft 41 through the bevel gears 38 and 40, the shaft 46 is simultaneously driven through the bevel gear 45 mounted thereon in engagement with the bevel gear 38 on the sleeve 33. Rotation of the shaft 46 is transmitted through the worm 47 and the worm gear 48 to the drive-limit shaft 50, and as the drive-limit shaft rotates, it causes the threaded member 52 to move longitudinally in the slots of the tubular member 53. So long as the clutch 30 is in engagement to drive the transmission shaft 41, the drive-limit shaft 50 is likewise being driven and is advancing the threaded member 52 toward the clutch fork arm 55. When the blade-turning means has been actuated to a predetermined extent, corresponding to a predetermined maximum or minimum pitch of the propeller blades, the tongue 54 on the threaded member 52 comes into engagement with the arm 55 associated with the clutch fork 37. Continued operation of the mechanism beyond this point causes the tongue 54 of the threaded member 52 to draw the clutch fork back and thereby to disenagage the clutch, thus preventing further change of pitch in the direction in which it has been changed by operation of the apparatus described above.

The shaft 46 is also provided with means for indicating the degree of pitch of the propeller blade at any instant. It is apparent that the degree of pitch at any moment depends upon the extent by which the transmission shaft 41 has been rotated. The transmission shaft 41 is in engagement with the shaft 46 through the train of bevel gears 40, 38 and 45, and, consequently, the degree by which the shaft 46 has rotated is an indication of the degree of pitch of the propeller blades. The shaft 46 is threaded internally and a correspondingly threaded indicating member 56 is positioned within the threaded interior of the shaft 46 in engagement with the internal threads formed therein. The indicating member 56 is slotted longitudinally and a tooth 57 associated with a frame member 58 engages in the longitudinal slot to prevent rotation of the member 56 without hindering longitudinal movement thereof. As the shaft 46 rotates, it causes the threaded member 56 to move in or out, depending upon the direction in which the shaft 46 rotates. The extent by which the shaft 46 has been rotated at any instant thus corresponds to the extent by which the threaded member 56 projects beyond the end thereof, and this provides an indication of the degree of pitch of the propeller blades at any moment. The member 56 may be suitably connected to an indicating pointer or other device mounted conveniently with respect to the operator so that he may observe the pitch of the propeller blades at any instant.

As pointed out above, the driving clutch member 31 rotates continually during operation of the propeller assembly, and since the propeller assembly rotates always in the same direction, the clutch member 31 always rotates in the same direction. It is therefore possible to alter the pitch of the propeller blades through the clutch 30 in one direction only, and means must be provided for altering the pitch in the other direction.

For this purpose, a second pitch adjustment drive shaft 60 and a second sleeve member 61 are associated, respectively, with a driving clutch member 62 and a driven clutch member 63 of a clutch 64. A gear 65 is mounted on the second pitch adjustment drive shaft 60 in engagement with the gear 26 secured to the hub of the propeller assembly. A bevel gear 66 mounted on the sleeve 61 engages a corresponding bevel gear 67 mounted on the transmission shaft 41. This mechanism is an exact counterpart of the above-described pitch adjustment drive shaft 27, clutch 30, sleeve 33 and bevel gears 38 and 40, differing therefrom only in that it serves to rotate the transmission shaft 41 in a direction opposite to that in which the transmission shaft is rotated through the clutch 30. Thus, to change the pitch of the propeller blade in one direction, the clutch members of the clutch 30 are introduced into engagement, the clutch members of the clutch 64 being disengaged, and to alter the pitch in the opposite direction, the members of the clutch 64 are engaged and the members of the clutch 30 are disengaged.

A drive-limit shaft 68, actuated by the sleeve 61 through a shaft 70 carrying a bevel gear 71 in engagement with the bevel gear 66 mounted on the sleeve and worm gearing 72 associated with the shaft 70 and the drive-limit shaft 68, is provided to prevent too great a change in the pitch of the propeller blades in the direction corresponding to operation of the transmission shaft 41 through the clutch 64.

It will be observed that in the foregoing structure, the transmission shaft 41 is operated at substantially the same speed as the pitch adjustment drive shafts 27 and 60, since no substantial reduction in the speed of operation is afforded by the level gears employed. Moreover, the ratio between the gear 26 mounted on the propeller hub and the gears 28 and 65 in engagement therewith is low. Consequently the transmission shaft 41, when in operation, rotates roughly at the speed with which the propeller assembly itself rotates. The apparatus described, therefore, is adapted to change the pitch of a propeller blade at a relatively rapid rate, say at a rate of about 45° per 100 revolutions of the propeller assembly.

The apparatus shown in Fig. 4 is similar to the apparatus described above, but is adapted to change the pitch of a propeller blade relatively slowly. In this apparatus, the gear 26 mounted on the hub of the propeller assembly engages with gears 75 and 76 secured to pitch adjustment drive shafts 77 and 78. Driving clutch members 80 and 81 are secured to the pitch adjustment drive shafts 77 and 78, respectively, and rotate continually during operation of the propeller assembly.

Sleeves 82 and 83 are mounted about the pitch adjustment drive shafts 77 and 78 respectively in rotatable relationship therewith. Driven clutch members 84 and 85 are slidably mounted on the sleeves 82 and 83 respectively, and are adapted each to be introduced into engagement with the corresponding driving clutch member 80 or 81. A bevel gear 86 is mounted on one of the sleeves 82 and a similar bevel gear 87 is mounted on the other sleeve 83. A sub-drive shaft 88 is mounted between the sleeves 82 and 83 and is provided with bevel gears 90 and 91 at either end in engagement with the bevel gears 86 and 87 associated with the sleeves 82 and 83, respectively. One of the sleeves 82 is provided with a worm 92 rigidly secured thereto and engaging with a worm gear 93 mounted on a transmission shaft 94. The transmission shaft 94 carries the worm 25 for actuating the blade-turning means.

The transmission shaft 94 may be, and preferably is, substantially longer than the transmission shaft 41 described above, since it is not in the plane of the pitch adjustment drive shafts. The transmission shaft 94 is fitted adjacent either end with worms 95 and 96 for operating drive-limit shafts 97 and 98. The drive-limit shafts 97 and 98 operate in substantially the same manner as the drive-limit shafts 50 and 68, described above, to limit the extent to which the pitch of the propeller blade may be adjusted. Indicator mechanism 100, similar to the indicator 56, described above, is also provided.

The modified form of apparatus operates substantially as follows: Upon introducing one of the driven clutch members 84 into engagement with the corresponding driving clutch member 80, the sleeve 82 upon which the driven clutch member 84 is mounted commences to rotate. The worm 92 mounted upon the sleeve 82 thereupon drives the transmission shaft 94 at a relatively low rate of speed through the worm gear 93 mounted thereon, and the transmission shaft 94 in turn actuates the blade-turning means through the worm 25. During rotation of the sleeve 82, the sub-drive shaft 88 is rotated through the engaging bevel gears 86 and 90 associated with the sleeve 82 and with the sub-drive shaft 88, respectively. The sub-drive shaft in turn causes rotation of the driven clutch member 85 through the engaging bevel gears 91 and 87 and the sleeve 83, but since the driven clutch member 85 is not in engagement with its corresponding driving clutch member 81, it rotates idly.

When it is desired to alter the pitch of the propeller blade in the opposite direction, after disengagement of the driven clutch member 84, the other driven clutch member 85 is introduced into engagement with its corresponding driving clutch member 81. The driven clutch member 85 thereupon causes rotation of the sleeve 83 and the bevel gear 87 associated therewith, driving the sub-drive shaft 88 through the bevel gear 91 and causing rotation of the sleeve 82 through the engaging bevel gears 90 and 86 associated with the sub-drive shaft and with the sleeve 82 respectively. The clutch member 84 associated with the sleeve 82 is in the disengaged position, so it rotates idly; since the sleeve is being rotated, however, the worm 92 mounted thereon drives the transmission shaft 94 through the worm gear 93, but in a direction opposite to that in which it is rotated when driven directly through the clutch member 84.

Owing to the substantial reduction ratio between the worm 92 and the worm gear 93 through which the transmission shaft 94 is operated, the transmission shaft 94 operates at a substantially lower rate of speed than the pitch adjustment drive shafts. This apparatus, therefore, is well adapted to vary the pitch of a propeller blade at a relatively slow rate, say at a rate of about 45° per 1000 to 1500 revolutions of the propeller assembly.

Either of the forms of the invention described above are well suited for adjusting the pitch of a propeller blade, but, of course, they are limited to a single rate of operation; that is, in either of the forms of apparatus described above the rate at which the pitch of the propeller is adjusted with respect to the rate at which the propeller assembly rotates is fixed. It is frequently desirable to have a mechanism which may be operated either at a relatively high speed or at a relatively low speed, and the invention contemplates the provision of such apparatus substantially by combining the two forms of apparatus described above.

Figs. 5 and 6 show apparatus by means of which it is possible to vary the pitch of a propeller blade either relatively rapidly or relatively slowly, as the operator desires. The apparatus comprises a pair of pitch adjustment drive shafts 101 and 102. Gears 103 and 104 are mounted on the pitch adjustment drive shafts 101 and 102 respectively in engagement with a gear 26 secured to the propeller hub. A sleeve 105 is mounted about one of the pitch adjustment drive shafts 101 in rotatable relationship therewith, and a similar sleeve 106 is mounted in rotatable relationship about the other pitch adjustment drive shaft 102. Driving clutch members 107 and 108 of clutches 110 and 111 are secured to the pitch adjustment drive shafts 101 and 102, respectively, and are adapted to be driven through the gears 103 and 104 at all times during rotation of the propeller assembly. Driven clutch members 112 and 113 are slidably mounted on the sleeves 105 and 106 respectively in non-rotatable relationship therewith. These driven clutch members 112 and 113 are adapted to be moved into engagement with the corresponding driving clutch members 107 and 108 respectively by means of clutch forks 114 and 115. A bevel gear 116 is securely mounted upon one of the sleeves 105, and a similar bevel gear 117 is firmly mounted upon the other sleeve 106. A sub-drive shaft 118 is mounted between the sleeves 105 and 106 and carries at either end bevel gears 120 and 121 in engagement with the bevel gears 116 and 117 respectively on the sleeves 105 and 106.

A transmission shaft 122 carries the worm 25 through which the blade-turning means are actuated, and suitable transmission means are provided to actuate the transmission shaft either at a relatively high rate of speed or at a relatively low rate of speed. The high speed transmission means comprise a pinion 123 mounted securely on the sub-drive shaft 118. The pinion 123 is in engagement with a corresponding pinion 124 mounted for rotation on a transmission-supporting shaft 125. A high speed transmission clutch member 126, preferably of the gear type, is rigidly associated with the pinion 124, and is adapted to rotate with it.

A speed selector clutch member 127 is slidably and rotatably mounted on the transmission-supporting shaft 125, and is provided adjacent one end with teeth 128 corresponding to teeth 130 with which the high speed transmission clutch member 126 is provided. The speed selector clutch member is provided with a gear 131 engaging a corresponding gear 132 mounted on the transmission shaft 122. A vertically mounted speed selector clutch fork 133 is provided to move the speed selector clutch member 127 into or out of engagement with the high speed transmission clutch member 126.

Low speed transmission means for actuating the transmission shaft 122 at relatively low speed comprise a worm 134 firmly secured to one of the sleeves 105 mounted about one of the pitch adjustment drive shafts 101. The worm 134 engages with a worm gear 135 associated with a low speed transmission clutch member 136. The low speed transmission clutch member 136, together with the worm gear 135 associated therewith, is rotatably mounted on the transmission-supporting shaft 125.

The slidably mounted speed selector clutch member 127 is provided with teeth adapted to engage corresponding teeth 137 with which the low speed transmission clutch member 136 is provided. Advantageously, the gear 131 of the speed selector clutch member 127 provides the teeth for engagement with the teeth 137 of the low speed transmission clutch member 136.

The apparatus operates substantially as follows: One of the clutches 110 associated with one of the pitch adjustment drive shafts 101 is moved into the engaged position, whereupon the sleeve 105 will commence to rotate, driving the low transmission clutch member 136 through the worm 134 and worm gear 135, and simultaneously driving the high speed transmission clutch member 126 through the engaging bevel gears 116 and 120, the sub-drive shaft 118, and the engaging pinions 123 and 124. The driven clutch member 113 of the clutch 111 will also be driven through the bevel gears 121 and 117 mounted on the sub-drive shaft 118 and the sleeve 106, respectively, when the clutch 110 is in the engaged position, but inasmuch as this clutch member is not in the engaged position, it will rotate idly. The speed selector clutch member 127 may be in engagement either with the low speed transmission clutch member 137, or the high speed transmission clutch member 126. In either event, the gear 131 associated with the speed selector clutch member will be in engagement with the pinion 132 on the transmission shaft 122, and the transmission shaft will, therefore, be driven either at relatively high speed through the high speed transmission clutch member 126, or at relatively low speed through the low speed transmission clutch member 137, in accordance with which of these transmission clutch members the speed selector clutch member is in engagement.

To vary the pitch in the direction opposite to that controlled by the clutch 110, the driven clutch member 113 is moved into the engaged position. Thereupon the high speed transmission clutch member will again be driven at high speed, but this time in a reversed direction, through the bevel gears 117 and 121, the transmission shaft 118, and the engaging pinions 123 and 124. At the same time, the sleeve 105 will be driven in a reversed direction by the sub-drive shaft through the engaging bevel gears 120 and 116, thereby rotating the driven clutch member 112 idly and driving the low speed transmission clutch member 136 through the worm 134 and the worm gear 135. The transmission shaft 122 will thereupon be rotated in a reversed direction at either a relatively high speed or at a relatively low speed, depending upon whether the speed selector clutch member 127 is in engagement with the high speed transmission clutch member 126 or with the low speed transmission clutch member 136. The gear 131 associated with the speed selector clutch member 127 always is in engagement with the pinion 132 on the transmission shaft 122.

The apparatus shown in Fig. 6 embodies the various protective features described in conjunction with the forms of the apparatus shown in Figs. 2 to 4, inclusive. Thus, the driven members 112 and 113 of the clutches 110 and 111 are each provided with toothed portions 140 and 141 adapted to engage correspondingly toothed portions 142 and 143 of members 144 and 145 associated with the supporting frame of the apparatus when the clutches 110 and 111 are fully disengaged.

In addition, means are provided to avoid varying the pitch of the propeller blades beyond a predetermined maximum or minimum pitch. To this end, the transmission shaft 122 extends beyond the pitch adjustment drive shafts 101 and 102, and is fitted adjacent each end and with worms 146 and 147 (advantageously having equal but opposite pitches) engaging worm gears 148 and 150 associated with suitably mounted drive-limit shafts 151 and 152. Each of the drive-limit shafts 151 and 152 are threaded over a distance of roughly half their length and carry internally threaded members 153 and 154. The internally threaded members are held against rotation by slotted tubular members 155 and 156 with the slots in which projections formed adjacent the outer surfaces of the threaded members 153 and 154 engage. The threaded members 153 and 154 are provided with tongues 157 and 158 adapted to engage with arms 160 and 161 associated with the clutch forks 114 and 115. The drive-limit shafts 151 and 152 rotate at all times during operation of the transmission shaft 122, and as they rotate, they cause the internally threaded members 153 and 154 to advance toward or retract from the arms 160 and 161 associated with the clutch forks 114 and 115. When the transmission shaft 122 has been driven to an extent corresponding, say, to a predetermined maximum pitch variation, the tongue 158 of the threaded member 154, which has been advanced toward the arm 161 associated with the clutch fork 115 controlling the clutch 111 operating to increase the pitch of the propeller, engages the arm 161 and retracts the clutch fork 115 to disengage the clutch and prevent further increase of the pitch of the propeller. The other drive limit shaft 151 with the threaded member 153 mounted thereon acts in precisely the same manner to disengage the clutch 110, but, of course, functions to avoid changing the pitch of the propeller beyond, a predetermined limit in the other direction.

An indicator rod 162, having external threads formed thereon, engages corresponding internal threads formed in one end portion of the transmission shaft 122. The indicator rod 162 is slotted longitudinally and is held against rotation by teeth 163 formed on a frame member 164. As the transmission shaft rotates, it causes the indicator member 162 to move inwardly or outwardly, depending upon the direction of rotation of the transmission shaft. Since the degree of the pitch of the propeller blades is a direct function of the extent by which the transmission shaft 122 has rotated, the extent by which the indicator rod 162 projects beyond the transmission shaft is an indication of the degree of pitch of the propeller blades at any instant. The indicator rod 162 may be suitably connected to an indicating dial mounted conveniently with respect to the operator, so that he may tell at a glance the exact pitch of the propeller blades at any moment.

As pointed out above, it is extremely desirable to avoid simultaneously engaging more than one of the clutches through which the transmission shaft, and, consequently, the blade-turning means are actuated. Control means for achieving this end are shown in Figs. 7 to 9. The control means are described below with particular reference to the form of apparatus shown in Figs. 5 and 6, but it is understood that these control means may equally well be associated with any of the forms of the apparatus.

The control mechanism is small and compact, and is adapted to be mounted close to the operator. It comprises a pair of body members 170 and 171 spaced apart but secured to one another by studs 172. A reciprocable member 173 is mounted in one of the body members 170, and a corresponding reciprocable member 174 is mounted in the other body member 171. The reciprocable members 173 and 174 are guided in their motion by upper and lower forward guide shafts 175 and 176 and by a rearward guide shaft 177. Compression springs 178 serve normally to hold the reciprocable members 173 and 174 in their forward positions. A cam shaft 180 is mounted between the frame members 170 and 171. A cam member 181 is mounted on the cam shaft adjacent one end thereof in engagement with one of the reciprocable members 173, and a similar cam member 182 is mounted on the other end of the cam shaft in engagement with the other reciprocable member 174. A control lever 183 is secured to the cam shaft 180 so that longitudinal motion of the control lever turns the cam shaft.

One of the cam members 181 has a relatively long downwardly extending arm 184 and a relatively short upwardly extending arm 185, both of which arms engage the reciprocable member 173 when it is in its most advanced position. The other arm 182 is likewise provided with a relatively long arm 186 and a relatively short arm 187, but here the relatively short arm 186 extends upwardly and the relatively short arm 187 extends downwardly, both arms being in engagement with the reciprocable member 174 when it is in its most advanced position.

One of the reciprocable members 173 is connected by a suitable connecting rod 190 with the clutch fork 115 controlling the clutch 111 through which the pitch of the propeller is varied in one direction. The other reciprocable member similarly is connected by a suitable connecting rod 191 with the clutch fork 114 controlling the clutch 110 through which the pitch of the propeller blades is varied in the other direction.

The most advanced position of the reciprocable members 173 and 174 corresponds to a neutral position of the control lever 183. Suppose that the control lever 183 is pushed forward. This will cause the cam shaft 180 to turn in a counter-clockwise direction (Fig. 7), and as it turns, the relatively long arm 184 of the cam member 181 will draw the reciprocable member 183 with which it is in engagement considerably to the rear. Simultaneously, the relatively short arm 187 of the other cam member 182 will draw the other reciprocable member 174 to the rear, but to a less extent than the reciprocable member 173 actuated by the relatively long arm 184 of the cam member 181. The reciprocable member 173 thereupon actuates the clutch fork 115 through the connecting rod 190 to engage the clutch 111 and commences operation of the blade-turning means. Simultaneously the other reciprocable member 174 will actuate the clutch fork 114 through the connecting rod 191 to move the driven clutch member 112 of the clutch 110 toward the engaged position and thereby to release the teeth 140 with which the driven clutch member 112 is provided from engagement with the teeth 142 of the member 144. Since the reciprocable member 174 has been drawn only slightly to the rear, however, it will not actually cause the driven clutch member 112 to engage with the corresponding driving clutch member 107.

If the control lever 183 is drawn to the rear, the operation of the apparatus is substantially the same as described above, but now it is the driven clutch member 112 of the clutch 110 which is moved all the way forward into the engaged position, and the driven clutch member 113 that is merely moved forward sufficiently to disengage the teeth 141 associated therewith from the corresponding teeth 143 of the member 145. It is thus apparent that, by pushing the control lever 183 forward, the apparatus described above is set in operation to change the pitch of the propeller blades in one direction, and if the control lever 183 is drawn to the rear, the apparatus is set in operation to change the pitch in the other direction.

The control mechanism shown in Figs. 7 to 9 also includes means for actuating the speed selector clutch member 127 (Fig. 6) to actuate the blade-turning means either at high speed or at low speed. A speed selector clutch control member 192 is provided with supporting arms 193 by means of which it is pivotally mounted on suitable supporting members 194. The clutch control member 192 is slotted longitudinally, and the control lever 183 extends upwardly through the slot. The mounting of the control lever 183 on the cam shaft 180 is by means of a fork 195 forming the lower end portion of the control lever and pivotally engaging a pin 196 extending through the cam shaft 180. By virtue of this mounting, the control lever 183 may be moved laterally, within limits, and, since it extends through the slot in the speed selector clutch control member 192, lateral movement of the control lever 183 correspondingly moves the speed selector clutch control member about its pivotal mounting.

The forward end portion of the speed selector clutch control member 192 comprises a fork 197 between the prongs of which is received an arm 199 of a pivotally mounted L-lever 200. The other arm 201 of the L-lever is connected by means of a connecting rod 202 to the fork 133 through which the speed selector clutch member 127 (Figs. 5 and 6) is controlled.

If the control lever 183 is moved laterally, say from right to left (i. e. from the position shown in solid lines in Figs. 8 and 9 to the position indicated by the dotted lines in those figures), it actuates the L-lever 200 to draw the connecting rod 202 to the rear and thereby operates the clutch fork 133 to move the speed selector clutch member 127 into engagement with the high speed transmission member 126. Similarly, if the control lever 183 is moved from left to right, it actuates the clutch fork 133 through the L-lever 200 and the connecting rod 202 to move the speed selector clutch member 127 into engagement with the low speed transmission means. Thus it is apparent that the blade-turning means for adjusting the pitch of the propeller blades may be actuated either at high speed or at low speed, depending upon whether the control lever 183 has been moved laterally to the right or laterally to the left.

For the purpose of facilitating operation of the control means shown and described, a cover member 203 is mounted on the body members 170 and 171. A right-hand guide slot 204 and a left-hand guide slot 205 are formed in the cover member and are connected adjacent their midpoints by a transverse slot 206. The control lever 183 moves in these slots, motion in the longitudinal slots serving to determine the direction in which the pitch is changed, and motion through the transverse slot 206 serving to determine the speed at which the change in pitch is effected.

I claim:

1. In an adjustable pitch propeller assembly, a rotating propeller hub, a propeller blade mounted on said hub, blade-turning means for turning the blade substantially about its longitudinal axis to adjust the pitch of the blade, a transmission shaft for actuating the blade-turning means, a gear secured to the propeller hub in non-rotatable relationship therewith, two substantially parallel pitch adjustment drive shafts, a gear mounted on each of the pitch adjustment drive shafts, each gear being in engagement with the gear secured to the propeller hub, a clutch associated with one of the pitch adjustment drive shafts, a worm connected with and driven by said clutch, a corresponding worm gear mounted on the transmission shaft in engagement with said worm, whereby the transmission shaft is driven in a forward direction through said clutch, a second clutch associated with the other of the pitch adjustment drive shafts, and means connecting said second-mentioned clutch with the first-mentioned clutch, whereby said transmission shaft is driven in a reversed direction through said second-mentioned clutch, said means connecting said second-mentioned clutch and said first-mentioned clutch, and said worm and worm gear.

2. In an adjustable pitch propeller assembly, a rotating propeller hub, a propeller blade mounted on said hub, blade-turning means for turning the blade substantially about its longitudinal axis to adjust the pitch of the blade, a gear secured to the propeller hub in non-rotatable relationship therewith, two substantially parallel pitch adjustment drive shafts, a gear mounted on each pitch adjustment drive shaft, each gear being in engagement with the gear secured to the propeller hub, a clutch associated with each pitch adjustment drive shaft, a transmission shaft for actuating the blade-turning means, transmission means associated with each clutch and with the transmission shaft through which the transmission shaft may be actuated at either of two speeds, and means for engaging either clutch at will to drive the transmission shaft through the transmission means either in a forward direction or in a reversed direction but preventing simultaneous engagement of both clutches.

3. In apparatus of the class described, blade-turning means for adjusting the pitch of a propeller blade, a clutch member through which the blade-turning means is actuated in a forward direction, a second clutch member through which the blade-turning means is actuated in a reversed direction, means normally preventing rotation of the clutch members when neither clutch is in a driving position, and clutch control means comprising a body member, a reciprocable member mounted in said body member and associated with the first-mentioned clutch member for actuating the same, a second reciprocable member mounted in the body member and associated with the second-mentioned clutch member for actuating the same, a cam shaft, a pair of cams each having a long arm and a short arm mounted on the cam shaft, each cam being associated with one of the reciprocable members, and means for imparting a turning movement to the cam shaft, a turning movement in one direction serving to actuate the first-mentioned reciprocable member to release the first-mentioned clutch member from the means normally preventing rotation thereof and to actuate the second-mentioned reciprocable member to introduce the second-mentioned clutch member into its driving position, and a turning movement in the opposite direction serving to actuate the second-mentioned reciprocable member to release the second-mentioned clutch from the means normally preventing rotation thereof and to actuate the first-mentioned reciprocable member to introduce the first-mentioned clutch member into its driving position.

4. In an adjustable pitch propeller assembly, a rotating propeller hub, a propeller blade mounted on said hub, blade-turning means for turning the blade substantially about its longitudinal axis to adjust the pitch of the blade, a gear secured to the propeller hub in non-rotatable relationship therewith, a pitch adjustment drive shaft, a gear mounted on said pitch adjustment drive shaft in engagement with the gear secured to the propeller hub, a clutch associated with the pitch adjustment drive shaft, a rotatable transmission shaft, means associated with the clutch and with the transmission shaft for driving the transmission shaft through the clutch, means associated with the transmission shaft for actuating the blade-turning means, thereby to adjust the pitch of the propeller blade, a drive-limit shaft, a worm gear mounted on the drive limit shaft, a worm mounted on the transmission shaft and engaging the worm gear, and means actuated by the drive-limit shaft for disengaging the clutch when the transmission shaft has rotated to an extent corresponding to a maximum pitch adjustment, whereby the propeller blade may be turned within limits in one direction about its longitudinal axis, and means for turning the blade in the opposite direction.

5. In an adjustable pitch propeller assembly comprising a rotating propeller hub, a propeller blade mounted on said hub, blade-turning means for turning the blade substantially about its longitudinal axis to adjust the pitch of the blade, said blade-turning means including a worm gear mounted for rotation on an axis substantially coincident with the axis of the hub, a gear secured to the propeller hub in non-rotatable relationship therewith, two substantially parallel pitch adjustment drive shafts mounted for rotation on axes substantially parallel to the axis of rotation of the propeller hub, a gear mounted on each pitch adjustment drive shaft, each gear being in engagement with the gear secured to the propeller hub, a clutch associated with each pitch adjustment drive shaft, a transmission shaft mounted for rotation on an axis substantially perpendicular to the axis of rotation of the worm gear of the blade-turning means and carrying a worm in engagement with said worm gear, a sub-drive shaft mounted substantially parallel to the transmission shaft and adapted to be driven through either clutch, high speed transmission means driven by the sub-drive shaft and low speed transmission means adapted to be driven through one clutch directly or through the other clutch and the sub-drive shaft for actuating the transmission shaft at either of two speeds, and means for engaging either clutch at will to drive the transmission shaft through the transmission means either in a forward direction or in a reverse direction but preventing simultaneous engagement of both clutches.

6. In an adjustable pitch propeller assembly comprising a rotating propeller hub, a propeller blade mounted on said hub, blade-turning means for turning the blade substantially about its longitudinal axis to adjust the pitch of the blade, said blade-turning means including a worm gear mounted for rotation on an axis substantially coincident with the axis of the hub, a gear secured to the propeller hub in non-rotatable relationship therewith, two substantially parallel pitch adjustment drive shafts mounted for rotation on axes substantially parallel to the axis of rotation of the propeller hub, a gear mounted on each pitch adjustment drive shaft, each gear being in engagement with the gear secured to the propeller hub, a clutch associated with each pitch adjustment drive shaft, a transmission shaft mounted for rotation on an axis substantially perpendicular to the axis of rotation of the worm gear of the blade-turning means and carrying a worm in engagement with said worm gear, a sub-drive shaft mounted substantially parallel to the transmission shaft and adapted to be driven through either clutch, transmission means for actuating the transmission shaft at either of two speeds and comprising high speed transmission means comprising a gear mounted on the sub-drive shaft and operatively connected with a high speed transmission gear, low speed transmission means comprising a worm driven by one of the clutches and operatively connected with a low speed transmission gear, and a speed selector clutch adapted to connect the transmission shaft alternatively with the high speed transmission gear or with the low speed transmission gear, and means for engaging either of the pitch adjustment drive shaft clutches at will to drive the transmission shaft through the transmission means either in a forward direction or in a reverse direction but preventing simultaneous engagement of both clutches.

ACHILLE ERNEST GABA.

CERTIFICATE OF CORRECTION.

Patent No. 2,138,487.            November 29, 1938.

ACHILLE ERNEST GABA.

It is hereby certified that error appears in the printed specification of the above numbered patent requiring correction as follows: Page 3, first column, line 25, for "he" read the; and second column, line 71, for "level" read bevel; page 6, first column, line 64, for the word "arm" read cam; and that the said Letters Patent should be read with this correction therein that the same may conform to the record of the case in the Patent Office.

Signed and sealed this 27th day of December, A. D. 1938.

Henry Van Arsdale
Acting Commissioner of Patents.

(Seal)

for turning the blade substantially about its longitudinal axis to adjust the pitch of the blade, said blade-turning means including a worm gear mounted for rotation on an axis substantially coincident with the axis of the hub, a gear secured to the propeller hub in non-rotatable relationship therewith, two substantially parallel pitch adjustment drive shafts mounted for rotation on axes substantially parallel to the axis of rotation of the propeller hub, a gear mounted on each pitch adjustment drive shaft, each gear being in engagement with the gear secured to the propeller hub, a clutch associated with each pitch adjustment drive shaft, a transmission shaft mounted for rotation on an axis substantially perpendicular to the axis of rotation of the worm gear of the blade-turning means and carrying a worm in engagement with said worm gear, a sub-drive shaft mounted substantially parallel to the transmission shaft and adapted to be driven through either clutch, high speed transmission means driven by the sub-drive shaft and low speed transmission means adapted to be driven through one clutch directly or through the other clutch and the sub-drive shaft for actuating the transmission shaft at either of two speeds, and means for engaging either clutch at will to drive the transmission shaft through the transmission means either in a forward direction or in a reverse direction but preventing simultaneous engagement of both clutches.

6. In an adjustable pitch propeller assembly comprising a rotating propeller hub, a propeller blade mounted on said hub, blade-turning means for turning the blade substantially about its longitudinal axis to adjust the pitch of the blade, said blade-turning means including a worm gear mounted for rotation on an axis substantially coincident with the axis of the hub, a gear secured to the propeller hub in non-rotatable relationship therewith, two substantially parallel pitch adjustment drive shafts mounted for rotation on axes substantially parallel to the axis of rotation of the propeller hub, a gear mounted on each pitch adjustment drive shaft, each gear being in engagement with the gear secured to the propeller hub, a clutch associated with each pitch adjustment drive shaft, a transmission shaft mounted for rotation on an axis substantially perpendicular to the axis of rotation of the worm gear of the blade-turning means and carrying a worm in engagement with said worm gear, a sub-drive shaft mounted substantially parallel to the transmission shaft and adapted to be driven through either clutch, transmission means for actuating the transmission shaft at either of two speeds and comprising high speed transmission means comprising a gear mounted on the sub-drive shaft and operatively connected with a high speed transmission gear, low speed transmission means comprising a worm driven by one of the clutches and operatively connected with a low speed transmission gear, and a speed selector clutch adapted to connect the transmission shaft alternatively with the high speed transmission gear or with the low speed transmission gear, and means for engaging either of the pitch adjustment drive shaft clutches at will to drive the transmission shaft through the transmission means either in a forward direction or in a reverse direction but preventing simultaneous engagement of both clutches.

ACHILLE ERNEST GABA.

---

CERTIFICATE OF CORRECTION.

Patent No. 2,138,487.   November 29, 1938.

ACHILLE ERNEST GABA.

It is hereby certified that error appears in the printed specification of the above numbered patent requiring correction as follows: Page 3, first column, line 25, for "he" read the; and second column, line 71, for "level" read bevel; page 6, first column, line 64, for the word "arm" read cam; and that the said Letters Patent should be read with this correction therein that the same may conform to the record of the case in the Patent Office.

Signed and sealed this 27th day of December, A. D. 1938.

Henry Van Arsdale
Acting Commissioner of Patents.

(Seal)